(12) United States Patent
Koreeda et al.

(10) Patent No.: US 7,641,397 B2
(45) Date of Patent: Jan. 5, 2010

(54) OPTICAL CONNECTOR

(75) Inventors: Yuichi Koreeda, Tokyo (JP); Akihiro Onogawa, Tokyo (JP); Yoshiteru Abe, Tokyo (JP); Masaru Kobayashi, Tokyo (JP); Ryou Nagase, Tokyo (JP); Masahiro Tsuchida, Tokyo (JP); Koichi Arishima, Tokyo (JP)

(73) Assignees: Japan Aviation Electronics Industry, Limited, Tokyo (JP); Nippon Telegraph and Telephone Corporation, Tokyo (JP); Hirose Electric Co., Ltd., Tokyo (JP)

( * ) Notice: Subject to any disclaimer, the term of this patent is extended or adjusted under 35 U.S.C. 154(b) by 698 days.

(21) Appl. No.: 10/569,856

(22) PCT Filed: Aug. 31, 2004

(86) PCT No.: PCT/JP2004/012902

§ 371 (c)(1),
(2), (4) Date: May 22, 2006

(87) PCT Pub. No.: WO2005/022229

PCT Pub. Date: Mar. 10, 2005

(65) Prior Publication Data

US 2006/0280409 A1    Dec. 14, 2006

(30) Foreign Application Priority Data

Sep. 1, 2003    (JP)    ............................ 2003-309137

(51) Int. Cl.
*G02B 6/38*    (2006.01)

(52) U.S. Cl. ........................... 385/65; 385/136; 385/137
(58) Field of Classification Search .................... 385/65
See application file for complete search history.

(56) References Cited

U.S. PATENT DOCUMENTS 4,948,219 A * 8/1990 Seino et al. .................... 385/95
6,026,210 A * 2/2000 Berglund et al. ............ 385/137

FOREIGN PATENT DOCUMENTS

JP    8-292344 A    11/1996

(Continued)

OTHER PUBLICATIONS

International Search Report.

*Primary Examiner*—Frank G Font
*Assistant Examiner*—Mary A El Shammaa
(74) *Attorney, Agent, or Firm*—Collard & Roe, P.C.

(57) ABSTRACT

The head end surface of an optical fiber (2) and the head end surface of an optical fiber (12) are butted to each other in an alignment member (22) of an adapter (21). In the butting, because one of the members clasping the optical fiber (2) is a plate (4a) that is short, the optical fiber (2) is bent and buckled between the left end of the short plate and the right end of the alignment member. Members clasping the optical fiber (12) are a long plate (14b) and a V-grooved base plate (13), and the optical fiber (12) is therefore horizontally fixed between each of right ends of the long plate and of the V-grooved base plate (13) and the left end of the alignment member. This results that the head end surface of the optical fiber (2) and the head end surface of the optical fiber (12) are in tight contact with each other, achieving excellent optical transmission between both optical fibers.

8 Claims, 8 Drawing Sheets

FOREIGN PATENT DOCUMENTS

| | | |
|---|---|---|
| JP | A 2000-19355 | 1/2000 |
| JP | A 2000-10355 | 7/2001 |
| JP | 2001-208938 A | 8/2001 |
| JP | 2001-208938 A | 8/2001 |

* cited by examiner

OPTICAL CONNECTOR

CROSS REFERENCE TO RELATED APPLICATIONS

Applicants claim priority under 35 U.S.C. §119 of Japanese Application No. 2003/309137 filed Sep. 1, 2003. Applicants also claim priority under 35 U.S.C. §365 of PCT/JP2004/012902 filed Aug. 31, 2004. The international application under PCT article 21(2) was not published in English.

TECHNICAL FIELD

This invention relates to a structure for fixing optical fibers in an optical connector.

BACKGROUND ART

A conventional optical fiber connecting device will be explained (see, e.g. Japanese Unexamined Patent Application Publication (JP-A) No. 2000-19355 (page 3, third paragraph, line 45 to page 4, fifth paragraph, line 15, FIGS. 1-4 and 7-9)).

FIG. 10 is a perspective view of an optical fiber connecting device before connection, in which two optical connectors A and B are connected to each other through an adapter C (shown in a broken fashion). The optical fiber connecting device comprises the first optical connector A, the second optical connector B, the adapter C, two lock springs 61, 61 for locking the first optical connector A and the second optical connector B to the adapter C, respectively, and so on.

As shown in FIGS. 8 and 9, the first optical connector A and the second optical connector B each comprise tape fibers 51 each formed by integrally fixing many optical fibers 52, arrayed side by side, into a flat plate shape by the use of a synthetic resin or the like, clamp members 53 each clamping the many optical fibers 52 that are exposed by removing a cover of the tape fiber 51 at its end portion, an alignment member 54 holding the tip end portions of the respective optical fibers 52 in the state where those tip end portions are aligned, a casing member 55 holding the clamp members 53, the alignment member 54, and so on, and a first fitting piece 56a or a second fitting piece 56b detachably held in a recess portion 55a of the casing member 55. The alignment member 54 is slidable inside the casing member 55 in an axial direction of the optical fibers 52. An elastic member 56b1 is provided on the lower side (the side pressing the optical fibers 52) of the second fitting piece 56b.

As the fitting piece, either one of the first fitting piece 56a shown in FIG. 9, (A) and the second fitting piece 56b shown in FIG. 9, (B) is selected and used. As will be described later, in the state of being fitted in the recess portion 55a of the casing member 55, the first fitting piece 56a is located on the inner side of the casing member 55 and does not press portions of the optical fibers 52 located between the clamp members 53 and the alignment member 54. On the other hand, in the same state, the second fitting piece 56b is located on the inner side of the casing member 55 and presses portions of the optical fibers 52 located between the clamp members 53 and the alignment member 54 as shown in FIG. 11 so as to substantially linearly hold the respective optical fibers 52 at these portions.

The adapter C comprises an alignment member 57 and a casing member 58 holding the alignment member 57. The alignment member 57 comprises, on its surface, micro-sleeves 57a into which the optical fibers 52 are inserted, respectively, a V-groove base plate 57b having V-grooves formed parallel to each other and holding the micro-sleeves 57a, respectively, a holding plate 57c holding the V-groove base plate 57b, and so on, thereby holding the tip end portions of the optical fibers 52 in a passable manner. Since it is configured such that the first fitting piece 56a or the second fitting piece 56b is detachably held in the recess portion 55a of the casing member 55 in the first optical connector A or the second optical connector B, bending for obtaining a buckling load (a load that produces a contact force between tip end surfaces of a pair of optical fibers by bending of at least one of the optical fibers) can be produced at each of the optical fibers 52 of the first optical connector A or the second optical connector B when assembling the optical connectors.

In the state shown in FIG. 12, by using the first fitting pieces 56a in both optical connectors A and B, the respective optical fibers 52 of both optical connectors A and B can be bent. Therefore, a buckling load is produced at each of the optical fibers 52 of both optical connectors A and B so that the end surfaces of the respective optical fibers 52 of both optical connectors A and B are in pressure contact with each other.

On the other hand, as shown in FIG. 13, by using the second fitting piece 56b in the left optical connector A and the first fitting piece 56a in the right optical connector B, it is possible to bend only the optical fibers 52 of the optical connector B. Therefore, a buckling load is produced at each of the optical fibers 52 of the optical connector B so that the end surfaces of the respective optical fibers 52 of both optical connectors A and B are in pressure contact with each other.

DISCLOSURE OF THE INVENTION

In the foregoing conventional optical fiber connecting device, selection can be made so as to bend or not to bend the optical fibers 52 by replacement between the first fitting piece 56a and the second fitting piece 56b.

However, the width of each of the fitting pieces 56a and 56b is equal to that of the casing member 55 and, further, the second fitting piece 56b should increase in height because the elastic member 56b1 is provided. Therefore, the optical connectors A and B cannot be prevented from increasing in size and, further, the replacement should be performed between the first fitting piece 56a and the entire second fitting piece 56b having the elastic member 56b1.

Therefore, this invention aims to provide an optical connector that can improve the foregoing drawback of the conventional technique, that can produce bending of each of optical fibers with a simple structure, thereby obtaining a buckling load, and further, that is compact.

This invention adopts the following means for solving the foregoing problem.

1. An optical connector adapted to hold a plurality of optical fibers and connect said optical fibers to a plurality of optical fibers of a mating optical connector, respectively, said optical connector characterized by comprising a housing, a V-groove portion for aligning said optical fibers, a plate for pressing said optical fibers to said V-groove portion, and a clamp for fixing said plate to said housing, wherein said V-groove portion extends in a fitting direction of said optical connector, said optical fibers are subjected to bending when said optical connector is connected to said mating optical connector in the case of said plate being a short plate, said optical fibers are not subjected to bending when said optical connector is connected to said mating optical connector in the case of said plate being a long plate, and either one of said short plate and said long plate can be selected.

2. An optical connector according to claim 1, characterized in that said housing has both side portions that are respectively provided with opening portions for engagement when said optical connector is inserted into an adapter.

3. An optical connector according to claim 1, characterized in that tip end surfaces of the optical fibers of said optical connector are aligned so as to slightly project from a tip end surface of a front portion of said housing in the case of said short plate, while, so as to be located substantially flush with the tip end surface of said front portion in the case of said long plate.

4. An optical connector according to claim 1, characterized in that tip end surfaces of the optical fibers of said optical connector and tip end surfaces of the optical fibers of said mating optical connector are butted to each other in an alignment member of an adapter.

5. An optical connector according to claim 1, characterized in that said housing comprises a bridge portion facing part of said V-groove portion and, when said long plate is used, part of said long plate is inserted between said bridge portion and said V-groove portion.

6. An optical connector according to claim 1 or 5, characterized in that said V-groove portion is integrally formed with said housing.

7. An optical connector according to claim 5, characterized in that said bridge portion is provided with a passing hole for the optical fibers of said optical connector.

8. An optical connector according to claim 5 or 6, characterized in that said clamp has at least one spring portion for pressing said plate and opening portions provided at said clamp are locked by stoppers provided at said housing.

BEST MODE FOR CARRYING OUT THE INVENTION

As the best mode for carrying out this invention, description will be made hereinbelow about one embodiment and its design modifications.

An optical connector of the embodiment of this invention will be described with reference to FIGS. 1 to 7.

Figure 1:
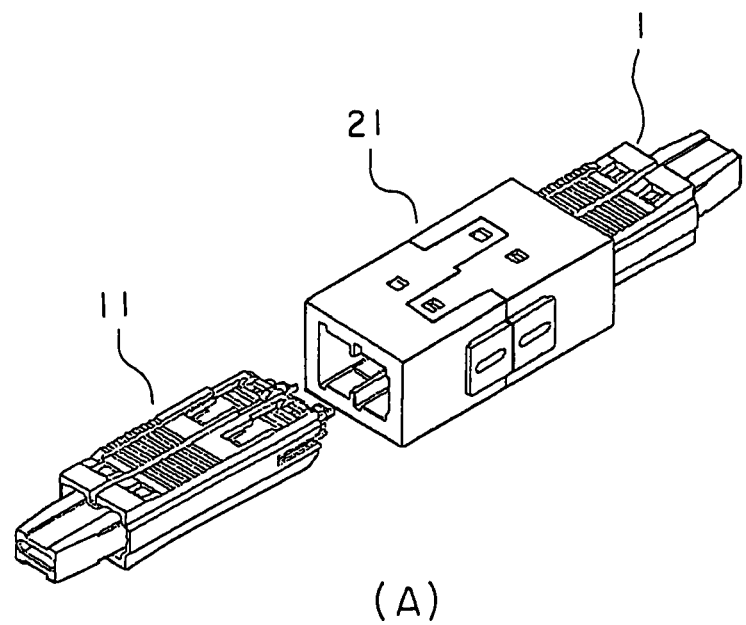
FIG. 1 shows a pair of optical connectors of one embodiment of this invention, wherein (A) is a perspective view of the state where one of the optical connectors is inserted in an adapter while the other optical connector is before insertion into the adapter and (B) is an exemplary sectional view of the state where both optical connectors are fitted together.
Figure 1:
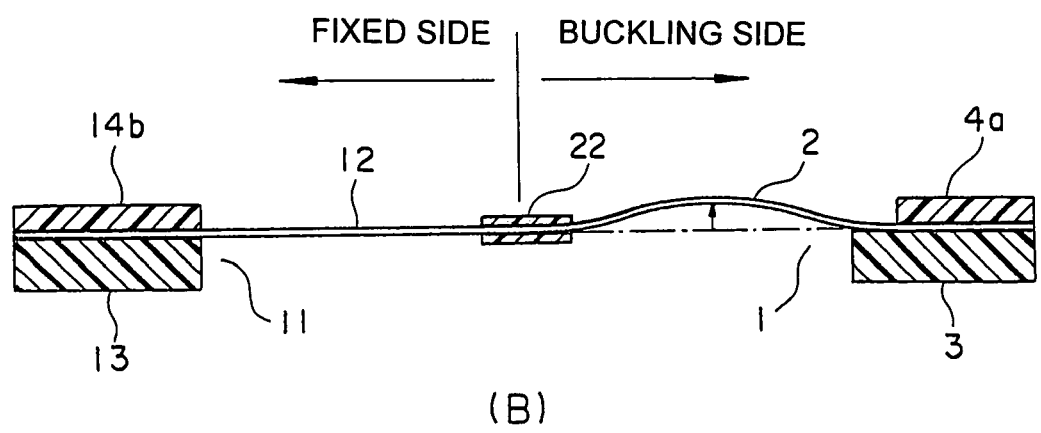

FIG. 1, (A) is a perspective view of the state where one optical connector 1 is inserted in an adapter 21 while the other optical connector 11 is before insertion into the adapter 21.

FIG. 1, (B) is an exemplary sectional view of the state where both optical connectors 1 and 11 are fitted together. Optical fibers 2 of the optical connector 1 are clasped between a V-groove base plate 3 made of a resin and a short plate 4a. Optical fibers 12 of the optical connector 11 are clasped between a V-groove base plate 13 and a long plate 14b. Tip end surfaces of the optical fibers 2 and tip end surfaces of the optical fibers 12 are butted to each other in an alignment member 22 of the adapter 21. This state is called a physical contact.

In this event, since one of the members clasping the optical fibers 2 is the short plate 4a, each of the optical fibers 2 is bent and buckled upward between a left end of the short plate 4a and a right end of the alignment member 22 as shown in the figure. Since the members clasping the optical fibers 12 are the long plate 14b and the V-groove base plate 13, each of the optical fibers 12 is horizontally fixed between right ends of the long plate 14b and the V-groove base plate 13 and a left end of the alignment member 22. Therefore, since the tip end surfaces of the optical fibers 2 and the tip end surfaces of the optical fibers 12 are in tight contact with each other, excellent light transmission is carried out between the optical fibers 2 and 12.

Now, the assembly of the optical connector 1 will be described with reference to FIGS. 2 to 7. The optical connector 11 is the same as the optical connector 1.

Figure 2:
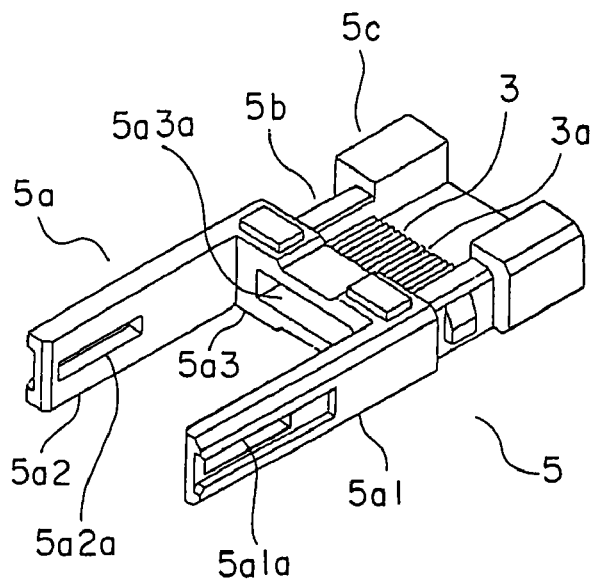
FIG. 2 is a perspective view of the state where a V-groove base plate is placed in a housing of the optical connector.
Figure 5:
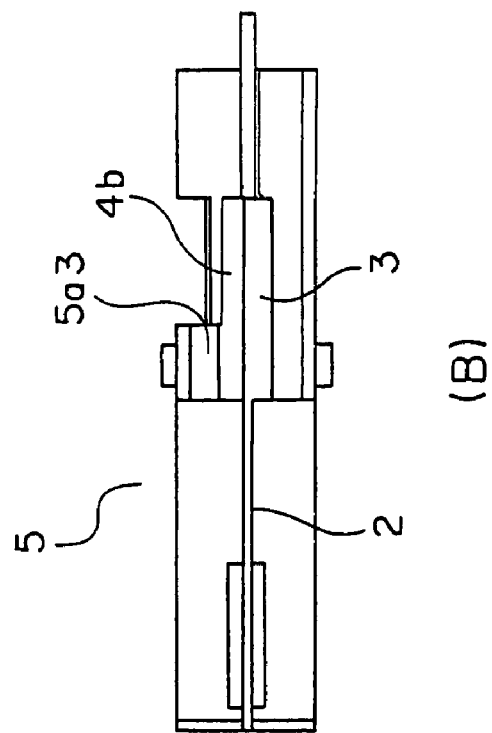
FIG. 5 is a sectional view of the state of FIG. 4, wherein (A) shows the case of the short plate and (B) shows the case of the long plate.
Figure 5:
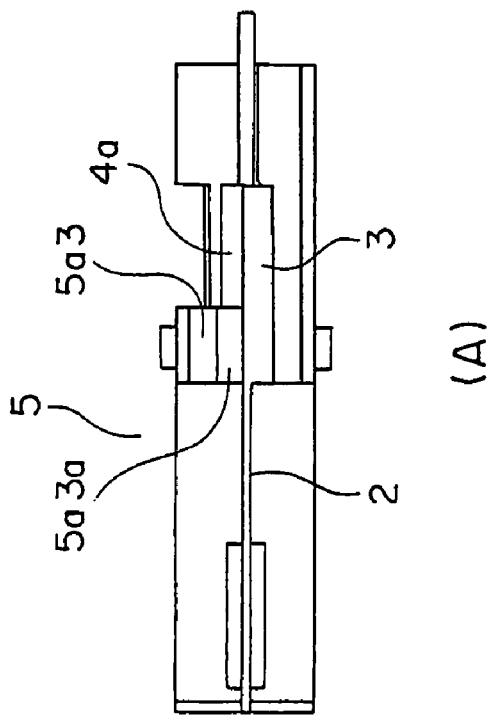

As shown in FIGS. 2 and 5, a housing 5 comprises a front portion 5a having a ⊐-frame shape, an intermediate portion 5b, and a rear portion 5c serving as an insertion side for many optical fibers 2 and is integrally formed of a resin material.

The front portion 5a comprises a left-side portion 5a1, a right-side portion 5a2, and a bridge portion 5a3 connecting between the left-side and right-side portions 5a1 and 5a2. The left-side and right-side portions 5a1 and 5a2 are respectively provided with opening portions 5a1a and 5a2a for engagement when the optical connector 1 is inserted into the adapter 21, while a passing hole 5a3a for the optical fibers 2 is provided at the center of the bridge portion 5a3.

The V-groove base plate 3 and the short plate 4a or the long plate 4b are placed at the intermediate portion 5b and the passing hole 5a3a. The V-groove base plate 3 is formed with many V-grooves 3a.

Figure 3:
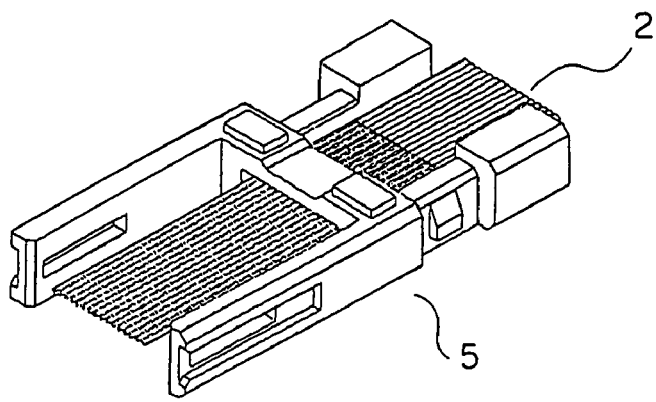
FIG. 3 is a perspective view of the state where many optical fibers are inserted in the state of FIG. 2.

As shown in FIG. 3, the optical fibers 2 are inserted from the rear portion 5c, placed on the grooves 3a, respectively, and pass through the passing hole 5a3a.

Figure 4:
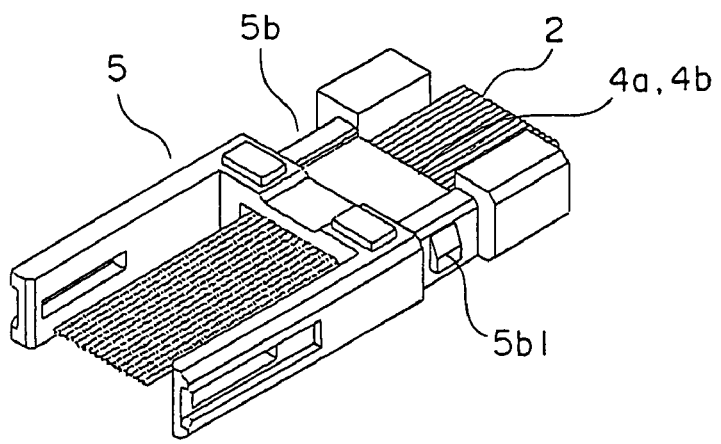
FIG. 4 is a perspective view of the state where a short plate or a long plate is further placed in the state of FIG. 3.

Subsequently, as shown in FIG. 4 and FIG. 5, (A) and (B), the short plate 4a or the long plate 4b is placed on the optical fibers 2.

Figure 6:
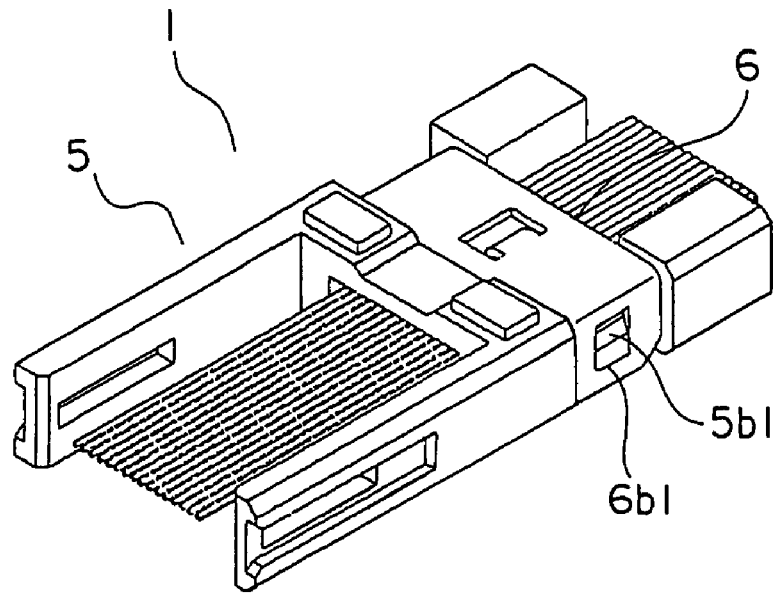
FIG. 6 is a perspective view of the state where the V-groove base plate and the short plate or the long plate are fixed to the housing by a clamp in the state of FIG. 4, i.e. the state where the assembly has been completed.
Figure 7:
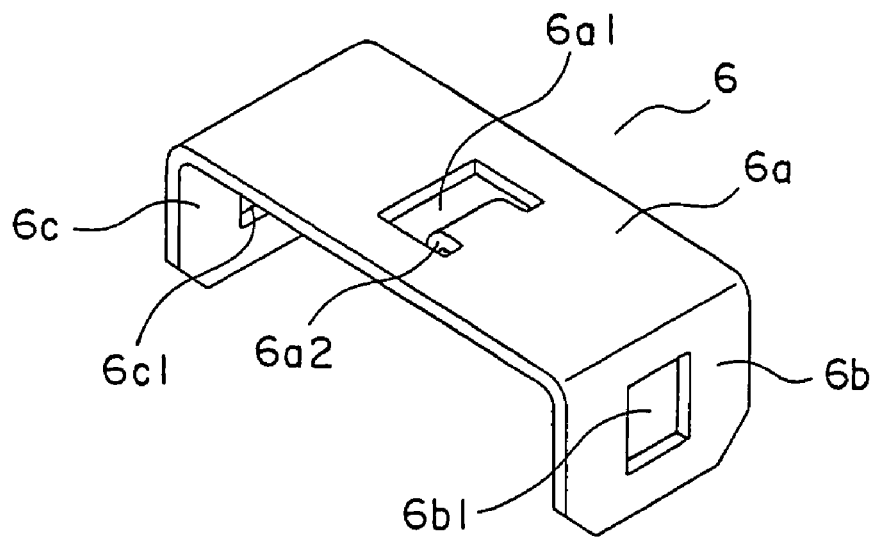
FIG. 7 is a perspective view of the clamp.
Figure 8:
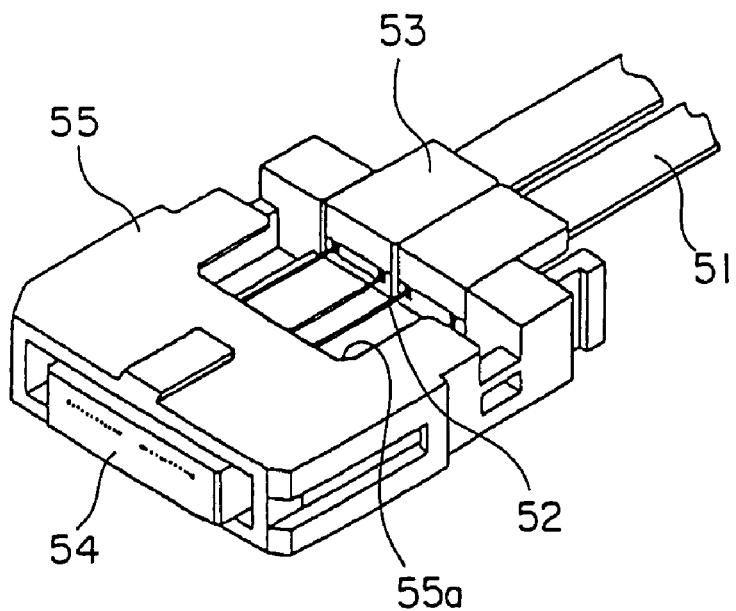
FIG. 8 is a perspective view of an optical connector in a conventional optical fiber connecting device.
Figure 9:
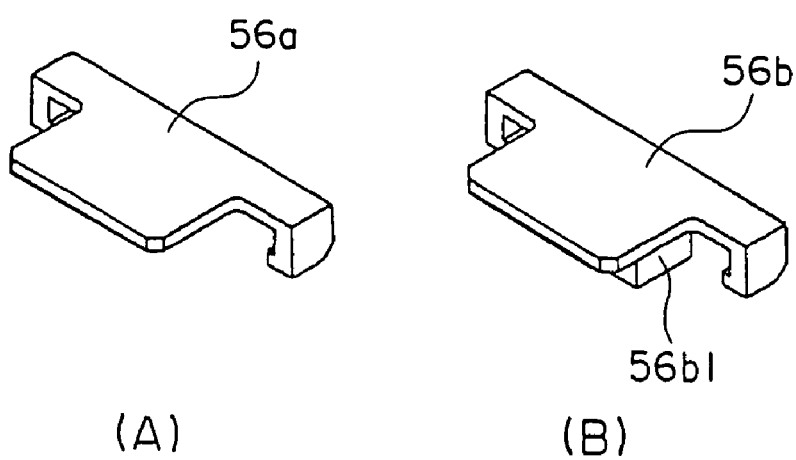
FIG. 9 is a perspective view of fitting pieces for the optical connector, wherein (A) shows the first fitting piece and (B) shows the second fitting piece.
Figure 10:
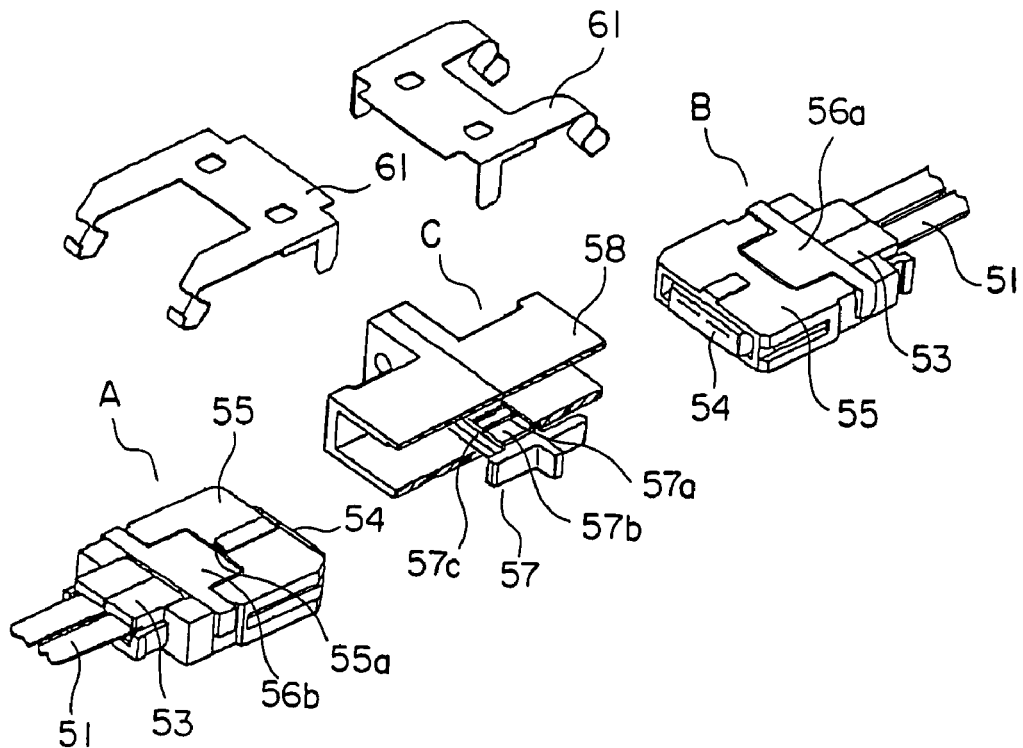
FIG. 10 is an exploded perspective view of the optical connector.
Figure 11:
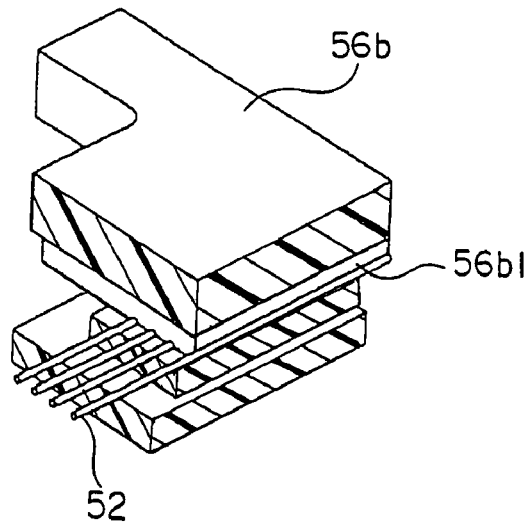
FIG. 11 is a perspective view showing, in a broken fashion, the state where the second fitting piece presses optical fibers.
Figure 12:
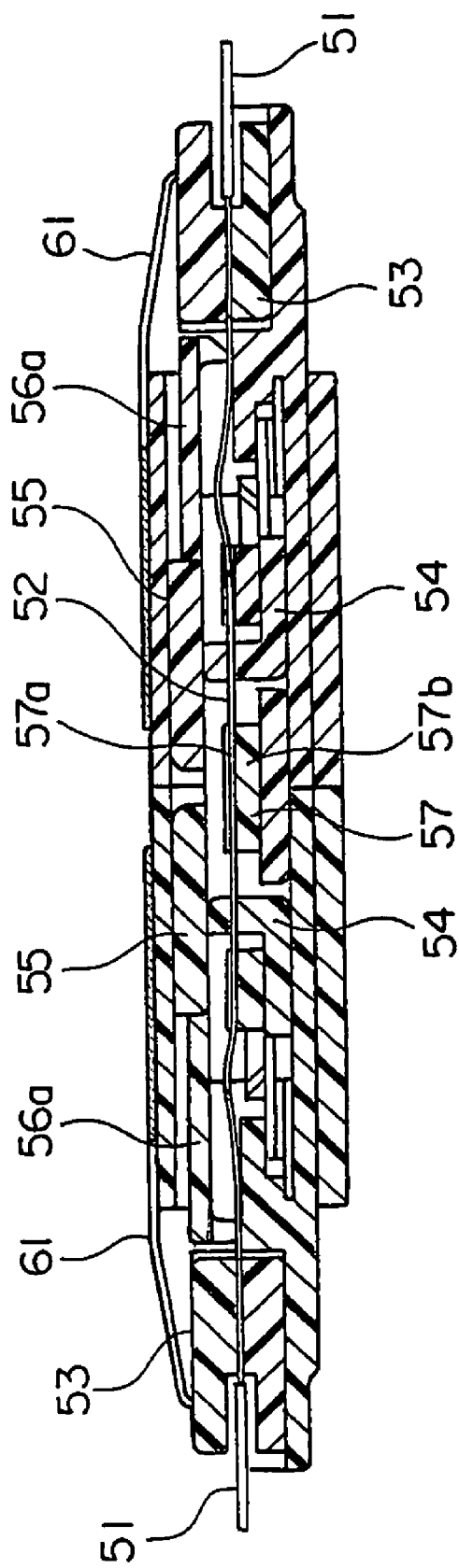
FIG. 12 is a sectional view of the state where the first fitting pieces are used in a pair of the optical connectors in the optical fiber connecting device.
Figure 13:
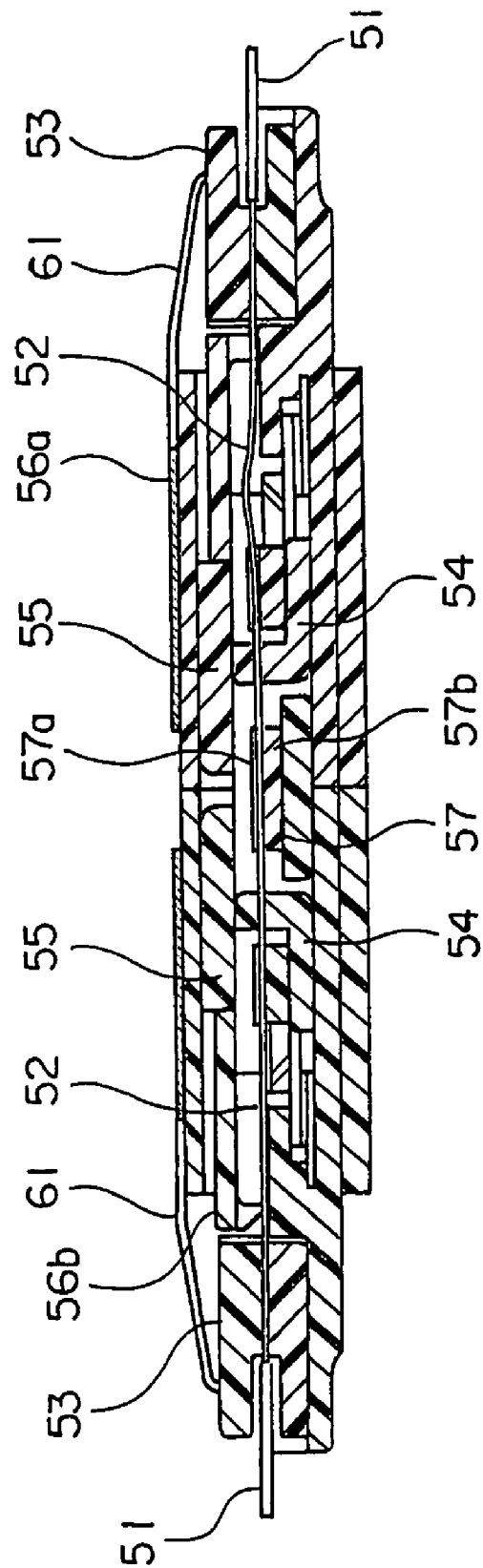
FIG. 13 is a sectional view of the state where the first fitting piece is used in one of a pair of the optical connectors and the second fitting piece is used in the other optical connector in the optical fiber connecting device.

Further, a clamp 6 of a resin or metal as shown in FIG. 7 is fixed so as to cover the intermediate portion 5b, so that the assembly of the optical connector 1 is completed as shown in FIG. 6. The clamp 6 has an upper surface portion 6a provided with a hole 6a1 and a spring portion 6a2 projecting into the hole 6a1 and has both side portions 6b and 6c provided with opening portions 6b1 and 6c1, respectively. When the clamp 6 is placed to cover the intermediate portion 5b, both opening portions 6b1 and 6c1 are locked by stoppers 5b1 provided at both side portions of the intermediate portion 5b. Further, the spring portion 6a2 presses the short plate 4a or the long plate 4b. Therefore, the respective optical fibers 2 are clasped between the corresponding V-grooves 3a of the V-groove base plate 3 and the short plate 4a or the long plate 4b while being applied with a predetermined force. The tip end surfaces of the respective optical fibers 2 are aligned so as to slightly project from tip end surfaces of the front portion 5a in the case of the short plate 4a, while, so as to be located substantially flush with the tip end surfaces of the front portion 5a in the case of the long plate 4b.

In this embodiment, the bridge portion 5a3 of the housing 5 faces part of the V-groove base plate 3 and part of the long plate 4b is inserted between the bridge portion 5a3 and the V-groove base plate 3. Therefore, the long plate 4b is securely held in the housing 5.

Further, the V-groove base plate 3 and the housing 5 are in the form of separate members in this embodiment, but may be subjected to design change so as to be integrally formed. Further, the clamp 6 may be subjected to design change so as to be provided with two or more spring portions 6a2.

As clear from the foregoing description, the following effects are achieved according to this invention.

1. Selection can be made so as to bend or not to bend the respective optical fibers by replacement between the short plate and the long plate. Therefore, it is possible to provide the optical connector that can produce bending of each of the optical fibers with the simple structure to thereby obtain the bucking load and, further, that is compact.

2. The housing has the bridge portion facing part of the V-groove portion (V-groove base plate 3) and, when the long plate is used, part of the long plate is inserted between the bridge portion and the V-groove portion. Therefore, the long plate is securely held in the housing with the simple structure.

3. By integrally forming the V-groove portion (V-groove base plate 3) and the housing, the number of parts is reduced, the assembly and disassembly are facilitated, and the cost is reduced. Further, the assembly of the optical connector is completed by causing the V-groove portion to directly hold the optical fibers, placing the plate on the optical fibers, and locking the opening portions provided at the clamp by the stoppers provided at the housing. Therefore, the assembly and disassembly can be easily carried out. Particularly, since this invention is the connector that directly connects the optical fibers, even when the optical fibers need to be replaced, it is possible to deal with it and, further, to achieve a reduction in size of the optical connector.

The invention claimed is:

1. An optical connector adapted to hold a plurality of optical fibers and connect said optical fibers to a plurality of optical fibers of a mating optical connector, respectively, said optical connector comprising a housing, a V-groove portion for aligning said optical fibers, a plate for pressing said optical fibers to said V-groove portion, and a clamp for fixing said plate to said housing, wherein said V-groove portion extends in a fitting direction of said optical connector, said optical fibers are subjected to bending when said optical connector is connected to said mating optical connector in the case of a length of said plate being shorter than a length of said V-groove portion, said optical fibers are not subjected to bending when said optical connector is connected to said mating optical connector in the case of a length of said plate being equal to a length of said V-groove portion, and the length of said plate can be selected.

2. An optical connector according to claim 1, wherein said housing has both side portions that are respectively provided with opening portions for engagement when said optical connector is inserted into an adapter.

3. An optical connector according to claim 1, wherein tip end surfaces of the optical fibers of said optical connector are aligned so as to slightly project from a tip end surface of a front portion of said housing in the case of the length of said plate being shorter than that of said V-groove portion, while, located substantially flush with the tip end surface of said front portion in the case of the length of said plate being equal to that of said V-groove portion.

4. An optical connector according to claim 1, wherein tip end surfaces of the optical fibers of said optical connector and tip end surfaces of the optical fibers of said mating optical connector are butted to each other in an alignment member of an adapter.

5. An optical connector according to claim 1, wherein said housing comprises a bridge portion facing part of said V-groove portion and, when said plate having a length equal to that of said V-groove portion is used, part of said plate is inserted between said bridge portion and said V-groove portion.

6. An optical connector according to claim 1, wherein said V-groove portion is integrally formed with said housing.

7. An optical connector according to claim 5, wherein said bridge portion is provided with a passing hole for the optical fibers of said optical connector.

8. An optical connector according to claim 5, wherein said clamp has at least one spring portion for pressing said plate and opening portions provided at said clamp are locked by stoppers provided at said housing.

* * * * *

UNITED STATES PATENT AND TRADEMARK OFFICE
CERTIFICATE OF CORRECTION

| | |
|---|---|
| PATENT NO. | : 7,641,397 B2 |
| APPLICATION NO. | : 10/569856 |
| DATED | : January 5, 2010 |
| INVENTOR(S) | : Koreeda et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 817 days.

Signed and Sealed this

Sixteenth Day of November, 2010

David J. Kappos
*Director of the United States Patent and Trademark Office*